(12) United States Patent
Gandhi

(10) Patent No.: US 10,061,620 B2
(45) Date of Patent: Aug. 28, 2018

(54) SYSTEM AND METHOD FOR CLUSTERING OF MOBILE DEVICES AND APPLICATIONS

(75) Inventor: Saumil Gandhi, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 60 days.

(21) Appl. No.: 13/539,809

(22) Filed: Jul. 2, 2012

(65) Prior Publication Data
US 2014/0006502 A1    Jan. 2, 2014

(51) Int. Cl.
    *G06F 15/16*     (2006.01)
    *G06F 9/50*     (2006.01)
    *G06F 9/52*     (2006.01)

(52) U.S. Cl.
    CPC .............. *G06F 9/5061* (2013.01); *G06F 9/52* (2013.01)

(58) Field of Classification Search
    CPC ........................... H04L 67/1002; H04L 45/46
    USPC .......................................................... 709/204
    See application file for complete search history.

(56) References Cited

U.S. PATENT DOCUMENTS

| | | | |
|---|---|---|---|
| 8,117,314 B2 | 2/2012 | Croft et al. | |
| 8,395,652 B1 * | 3/2013 | Chapweske et al. | 348/14.05 |
| 8,402,514 B1 * | 3/2013 | Thompson | H04L 63/08 726/4 |
| 2002/0055989 A1 | 5/2002 | Stringer-Calvert et al. | |
| 2003/0229900 A1 * | 12/2003 | Reisman | 725/87 |
| 2005/0071842 A1 * | 3/2005 | Shastry | G06F 9/5038 718/100 |
| 2005/0185636 A1 | 8/2005 | Bucher | |
| 2006/0172756 A1 * | 8/2006 | Sharony | H04W 40/02 455/519 |
| 2006/0259594 A1 * | 11/2006 | Paliwal et al. | 709/220 |
| 2010/0077069 A1 * | 3/2010 | Kim | G06F 9/5072 709/223 |
| 2010/0162036 A1 * | 6/2010 | Linden | G06F 11/181 714/4.11 |
| 2011/0145413 A1 * | 6/2011 | Dawson | G06Q 40/025 709/226 |
| 2012/0066487 A1 | 3/2012 | Brown et al. | |

OTHER PUBLICATIONS

Eugene E. Marinelli, Hyrax: Cloud Computing on Mobile Devices using MapReduce, Sep. 2009, Carnegie Mellon University Thesis.*

* cited by examiner

*Primary Examiner* — Sm Rahman
*Assistant Examiner* — Emad Siddiqi
(74) *Attorney, Agent, or Firm* — Haynes & Boone, LLP

(57) ABSTRACT

Systems and methods are disclosed to configure mobile devices to work in a mobile cluster and to collaboratively leverage applications resident on the cluster of mobile devices. Systems and methods are also disclosed to leverage device functionalities of mobile devices in the cluster to provide a replacement or an extension of device functionalities to the mobile device of a primary member in a failover condition. Configuration and management of the cluster may be through a cluster master. After the cluster is configured, actions may be taken by individual members of the cluster or initiated by the cluster master to collaborate on residing applications or to share device functionalities of the mobile devices. Each cluster member may determine the applications or the device functionalities that it wishes to collaborate or share with its cluster partners. A database keeps track of the applications for collaboration and the device functionalities for sharing.

20 Claims, 6 Drawing Sheets

SYSTEM AND METHOD FOR CLUSTERING OF MOBILE DEVICES AND APPLICATIONS

TECHNICAL FIELD

The present disclosure relates generally to computer networking and collaboration between computer devices in running applications and sharing features. In particular, the present disclosure relates to methods and systems for configuring mobile devices to work in a cluster and for leveraging resident applications and device functionalities of mobile devices in the cluster to create a more effective and robust computing environment.

BACKGROUND

There has been a proliferation in the use of mobile devices with increasing processing capabilities, such as smart phones, tablet computers, etc. Applications running on the mobile devices have also increased in their capability and sophistication. Many of the applications that once ran on computers are increasingly finding their way into mobile devices. Many new applications have also been developed to run on the mobile devices and many new features introduced to take advantage of their mobility. Mobile devices are also increasingly being used to run critical applications that cannot afford to experience any downtime. However, due to limitations on mobile devices, such as memory capacity, battery power, and processor speed, mobile applications may not always function properly or at all during various times of desired use. In addition, because of their mobility, mobile devices are susceptible to adverse operating conditions such as poor signal levels and limited data bandwidth. Accordingly, there is a need to create a more robust environment for the mobile devices to ensure that they may operate effectively, efficiently, and ubiquitously.

BRIEF SUMMARY

Systems and methods are disclosed herein to configure and leverage a cluster of mobile devices to collaboratively run applications and to share device functionalities for creating a more enriching and robust experience for the users. Mobile devices in a cluster may collaborate on applications to process information more effectively and efficiently. Mobile devices in a cluster may also mutually leverage their device functionalities to create a more robust computing environment.

In accordance with one or more embodiments of the present disclosure, an apparatus in a cluster network is disclosed. The apparatus includes a processor. The apparatus further includes a cluster database that lists one or more shared resources. Under the listing for each one of the shared resources are one or more cluster partners of the cluster network available to provide the shared resource. The apparatus further includes a memory that stores machine-readable instructions for execution by the processor for the apparatus to collaboratively use the shared resources. The apparatus monitors communication on the cluster network to update the cluster database. The apparatus also determines a resource for collaborative use from the shared resources listed in the cluster database. The apparatus also determines a cluster partner to collaborate on the resource. The apparatus further collaborates with the cluster partner on use of the resource.

In accordance with one or more embodiments of the present disclosure, a method of collaborating on shared resources among cluster partners of a cluster network is disclosed. The method includes maintaining by a device a cluster database containing a listing of one or more shared resources. Under the listing for each one of the shared resource are one or more cluster partners of the cluster network available to collaboratively use the shared resource. The method also includes monitoring by the device communication on the cluster network to update the cluster database. The method also includes determining by the device a resource for collaborative use from the listing of shared resources in the cluster database. The method further includes determining a cluster partner to collaborate on the selected resource. The method further includes collaborating between the device and the cluster partner on use of the resource.

In accordance with one or more embodiments of the present disclosure, a non-transitory computer readable medium having machine readable instructions for execution by a processor of a device to perform a method is disclosed. The method includes maintaining by a device a cluster database containing a listing of one or more shared resources. Under the listing for each one of the shared resource are one or more cluster partners of the cluster network available to collaboratively use the shared resource. The method also includes monitoring by the device communication on the cluster network to update the cluster database. The method also includes determining a resource for collaborative use from the listing of shared resources in the cluster database. The method further includes determining a cluster partner to collaborative on the selected resource. The method further includes collaborating between the device and the cluster partner on use of the resource.

These and other embodiments of the present disclosure will be more fully understood by reference to the following detailed description of the embodiments when considered in conjunction with the accompanying drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed herein to leverage applications resident on a cluster of mobile devices to run the applications collaboratively. Systems and methods are also disclosed to leverage device functionalities of mobile devices in a cluster to provide a replacement or an extension of device functionalities to the mobile device of a primary member in a failover condition. Configuration and management of the cluster may be through a cluster master. After the cluster is configured, actions may be taken by individual members of the cluster or initiated by the cluster master to collaborate on residing applications or to share device functionalities of the mobile devices. Each cluster member determines the applications or the device functionalities that it wishes to collaborate or share with its cluster partners. Collaborating on an application may entail distributing the processing of the application and exchanging data generated from the application among the cluster partners. The cluster master may coordinate the collaboration among the cluster partners. Alternatively, the cluster partners may coordinate the collaboration between them in a distributed fashion. Cluster partners may also share device functionalities to allow for continuous operation of applications under failover conditions. There may be a hierarchy of device functionalities shared to ensure continuous operation even when there are multiple failovers at multiple mobile devices, especially for applications that are mission critical. A database is maintained to keep track of the applications for collaboration and the device functionalities for sharing. Collaborating on the applications and sharing the device functionalities among cluster members enhances user experience and creates a more robust application environment.

Figure 1:
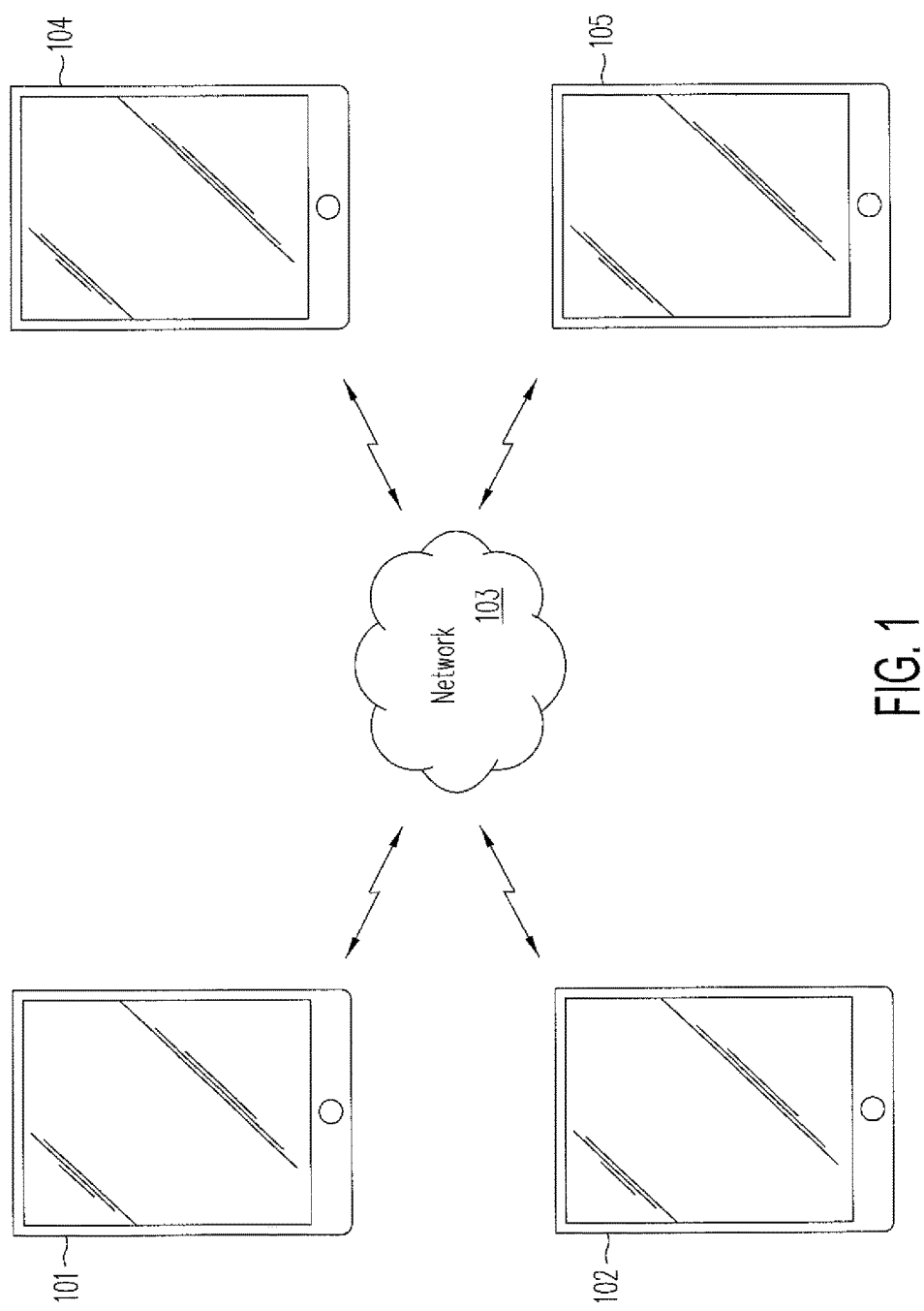
FIG. 1 shows a cluster of mobile devices that communicate through a network according to one or more embodiments of the present disclosure.

Refer now to the figures wherein the drawings are for purposes of illustrating embodiments of the present disclosure only, and not for purposes of limiting the same. FIG. 1 shows a cluster of mobile devices that communicate through a network according to one or more embodiments of the present disclosure.

A first mobile device 101 may collaboratively run applications, share device functionalities, or otherwise interact with mobile devices 102, 104, and 105 of the cluster through a network 103. Mobiles devices 101, 102, 104, and 105 are members of the cluster. Mobile devices 101, 102, 104, and 105 may be smart phones (e.g., iPhone, or other phones running Android, Window Mobile, or other operating systems), tablet computers (e.g., iPad, Galaxy), personal digital assistants (PDA), notebook computers, laptops, or various other types of wireless or wired computing devices. A mobile device may have one or more processors, memories, a battery, a touch screen display, communication components, GPS, etc. One skilled in the art would understand that the processors of the mobile device may run applications residing in the memories to perform various computing, communication, and gaming functions.

Network 103 may be implemented as a single network or a combination of multiple networks. For example, in various embodiments, the network may include the Internet, intranets, wireless communication networks (e.g., cellular phone networks, Bluetooth, LAN, WiFi, WiMax), landline networks, and/or other appropriate types of communication networks. As such, in various embodiments, network 103 may be a local network connecting mobile devices that are in close proximity, such as a WiFi network connecting mobile devices in a house, an office, or a dorm. Alternatively, network 103 may be a wide area network connecting mobile devices within a neighborhood, or a global network connecting mobile devices from across the world. For a more graceful handover of device functionalities in a failover condition or more seamless collaboration between cluster members collaborating on an application, it may be advantageous to have the mobile devices of the cluster in close proximity. A mobile device may be associated with an IP (Internet Protocol) address or a particular link (e.g., a link, such as a URL (Uniform Resource Locator)) to an IP address.

In one or more embodiments, mobile device 101 may be a cluster master that manages and coordinates the collaboration of applications or the sharing of device functionalities among the cluster members. A cluster master may also administer membership of mobile devices in the cluster. When the members collaborate on an application, the cluster master may distribute processing of the application among the cluster members. For example, mobile device 101 as the cluster master may run a closed-circuit TV application by leveraging the cameras of mobile devices 102, 104, and 105 to provide videos from different locations. Mobile device 101 may combine the videos from mobile devices 102, 104, and 105 for display on mobile device 101. Alternatively, the cluster members may coordinate the running of the application among the cluster members without a cluster master. For example, in the closed-circuit TV application, for each mobile device to display videos from all its cluster partners, each mobile device may transmit its captured video to all its cluster partners and may also receive the captured videos from all its cluster partners without going through a cluster master.

When the cluster members share device functionalities, a member may have its device functionalities replaced or extended by one or more cluster partners in a failover condition. For example, mobile device 101 may extend its battery power by offloading running of applications to mobile device 102 so as to slow the drain on the battery. In another example, mobile device 101 operating in a challenging signal reception environment may replace its cellular data function with that of mobile device 102 operating in a more favorable environment. As such, the cellular data function of mobile device 102 is activated to receive cellular data packets and to re-transmit the packets to mobile device 101 for consumption through network 103. Thus, mobile device 101 may communicate a failover condition to mobile device 102 and may receive data associated with the replaced or extended functionality from mobile device 102.

There may be a hierarchy of cluster partners for sharing device functionalities such that a cluster partner that replaces or extends the device functionality of a primary member may itself have cluster partners that replace or extend its own device functionalities. For example, mobile device 102 whose cellular data function replaces the cellular data function of mobile device 101 may have its cellular data function or another function replaced by mobile device 104. In one or more embodiments, the movement of data between the hierarchy of cluster partners may be made by a combination of multiple protocols. Similarly, the communication of a failover condition between the hierarchy of cluster partners may be through a combination of multiple protocols. A cluster master may be at the top of the hierarchy of cluster partners such that it may only leverage the device functionalities of other members but may not be called to share its own device functionalities. The designation of the cluster master may be dynamic. For example, when the battery of mobile device 101 is nearly drained, mobile device 102 may be designated as the new cluster master when mobile device 101 hands over all device functionalities to mobile device 102. As such, mobile device 102 assumes the top position in the hierarchy of shared device functionalities. Sharing of device functionalities enables continuous operation of mission critical applications across failover conditions.

Each member may determine the applications and device functionalities that it wishes to collaborate or share with the other members. Each cluster member may also maintain a cluster database to keep track of the membership of the cluster, the applications or device functionalities for collaboration or sharing, and for each application the cluster partners willing to collaborate with the member on the application and for each device functionality the cluster partners willing to share such device functionality with the member. For example, a cluster database for a member may show for each shared device functionality the cluster partner whose device functionality will replace or extend the device functionality of the member. There may be multiple cluster partners for a device functionality such that the device functionality of the member may be replaced or extended by the device functionality of any of the cluster partners. The priority that the device functionality of the multiple cluster partners is leveraged may be determined by the order in which the cluster partners are listed. For example, the device functionality of the first cluster partner listed may be leveraged before that of the second cluster partner listed. Alternatively, the device functionality of all the cluster partners may be leveraged simultaneously to replace or extend the device functionality of the member.

Device functionalities of a mobile device to be shared may include voice, cellular data, battery, WiFi, memory, CPU, display, GPS, etc. For example, if mobile device 101 is low on battery and mobile device 102 is the first cluster partner listed in its cluster database for battery, mobile device 101 may leverage mobile device 102 to run all applications except input/output functions so as to avoid draining battery power of mobile device 101. In one or more embodiments, mobile device 101 may forward all calls to mobile device 102 before mobile device 101 loses power or may automatically set an alternate voicemail redirecting callers to call mobile device 102. If mobile device 102 is also low in battery and mobile device 104 is the second cluster partner listed in the cluster database of mobile device 101, mobile device 104 may in turn be called upon to further extend the battery power of either mobile device 101 or mobile device 102. In another example, if mobile device 102 is running out of memory and mobile devices 104 and 105 are the cluster partners listed in the cluster database for memory, mobile device 102 may allocates a portion of the memory of mobile device 104 to expand the memory capacity of mobile device 102. Mobile device 102 may also allocate memories in both mobile devices 104 and 105 if mobile device 104 alone does not provide enough additional memories. In another example, if mobile device 101 needs to expand its display area and mobile device 102 is the cluster partner listed in the cluster database for display, the touch screen of mobile device 101 may be used as a keyboard and the screen of mobile device 102 used as a display for mobile device 101. In another example, if mobile device 101 loses its GPS signal due to poor signal reception and mobile device 104 is a cluster partner listed in the cluster database for GPS, mobile device 101 may use the GPS receiver on mobile device 104 if mobile device 104 is close by and has more favorable signal quality.

When there is a hierarchy of shared device functionalities, the cluster database for each member may be different because each member may independently determine one or more cluster partners whose device functionality will replace or extend that of the member. Alternatively, the cluster database for all the cluster members may be the same such that the cluster master may maintain a master copy of the cluster database for all the cluster members. When there is only a master cluster database, the hierarchy of shared device functionalities may be provided by the order of listing of cluster partners such that the device functionality of a cluster partner may be replaced or extended by one or more cluster partners listed following the cluster partner, but not preceding the cluster partner. The cluster database may identify cluster partners for applications and device functionalities using IP addresses, phone numbers, or other device/user identifiers.

When cluster partners collaborate on an application, the application may run more effectively or efficiently by distributing processing of the application among the collaborating cluster partners. User experiences may also be enhanced through sharing of data from the application between the cluster partners. For example, a photo-processing application may be used to generate a 3-D image or a 360° panoramic view of an object from a collection of photos of the object. If mobile device 101, 102, 104, and 105 are four cluster partners of the application, each cluster partner may take a photo of the object using the camera on its mobile device. The photos may be taken at different time or at the same time, and may include photos of the object taken at different angles. If mobile device 101 is the cluster master, mobile device 101 may capture photos of the object at one angle and may also request that the other cluster partners (mobile devices 102, 104, and 105) capture photos of the object at different angles and transmit the photos to mobile device 101. Mobile device 101 may run the photo-processing application to process the photos received from its cluster partners and photos taken by its own camera to generate a 3-D image or a 360° panoramic view of the object. Mobile device 101 may then share the generated image with its cluster partners in real time. As such, mobile devices 101, 102, 104, and 105 may collaborate on the photo processing application to generate 3-D images or 360° panoramic views of the object more effectively and efficiently.

In another example, cluster partners may collaborate on recording multiple tracks of a music composition. Mobile device 101 as the cluster master may direct each of its cluster partners (mobile devices 102, 104, and 105) to record a music track of a different musical instrument at a specified metronome beat. The three tracks recorded by mobile devices 102, 104, and 105 may be transmitted to mobile device 101 and combined with the track recorded by mobile device 101 to synthesize a four-track musical composition. Mobile device 101 may then share the synthesized composition with its three cluster partners in real time.

Each cluster member may emit a periodic heartbeat signal to signify its availability to collaborate on applications or share device functionalities with its cluster partners. The heartbeat signal for a cluster member may be a data packet containing identification information of the mobile device such as its IP address, and may also contain information on the applications the mobile device may join or the device functionalities the mobile device may share. The cluster member may broadcast its heartbeat signal to the other cluster members at a frequency set by the cluster member or by the cluster master. When the cluster member is no longer available to collaborate on any applications or to share any device functionalities, it may stop transmitting the heartbeat signal. The cluster master may monitor the heartbeat signals from the cluster members and determine the members that will be able to collaborate on a shared application or be leveraged to share a device functionality. For example, the cluster database maintained by mobile device 101 as the cluster master may indicate that the memories of mobile devices 102 and 104 are eligible to be leveraged when mobile device 101 is running low in memory. If mobile device 101 detects a heartbeat signal from mobile device 104, but not from mobile device 102, only the memory of mobile device 104 will be leveraged when mobile device 101 runs low in memory. Mobile device 101 may continue to monitor the heartbeat signal of mobile device 104 when mobile device 101 is leveraging the memory of mobile device 104. When mobile device 104 is running low in memory or battery power, mobile device 104 may stop emitting the heartbeat signal to indicate that its memory is no longer available. Mobile device 101 may then stop leveraging the memory of mobile device 104. The cluster master may dynamically update the cluster database based on the heartbeat signals received from the cluster members so that the cluster database reflects the current availability of the cluster members to collaborate on applications or to share device functionalities. In addition, the cluster master may update the cluster database as new members join the cluster or existing members leave the cluster, or as new applications or device functionalities are identified.

In one or more embodiments, the cluster master may receive a request from a new mobile device to join the cluster. The cluster master may authenticate the requesting mobile device by verifying that the mobile device belongs to a contact list, by requesting the user to provide a security code, or through other handshaking protocol. The level of authentication may be a function of the size of the network, the security of the network, or the number of cluster partners. For example, if network 103 is a WiFi network connecting mobile devices in a home, the level of authentication may be low. On the other hand, if network 103 is the Internet, a more secure authentication protocol may be necessary. Once the mobile device is authenticated, the cluster master updates the cluster database to add the IP address, phone number, or other device/user identifier of the new mobile device as a cluster member. The cluster master may also request the mobile device to identify the applications or device functionalities that the mobile device wishes to collaborate or share with its cluster partners. Alternatively, the cluster master may designate the applications or device functionalities for the mobile device to collaborate or share. The cluster master may add the mobile device as a cluster partner to the list of collaborating applications or shared device functionalities maintained in the cluster database.

Figure 2:
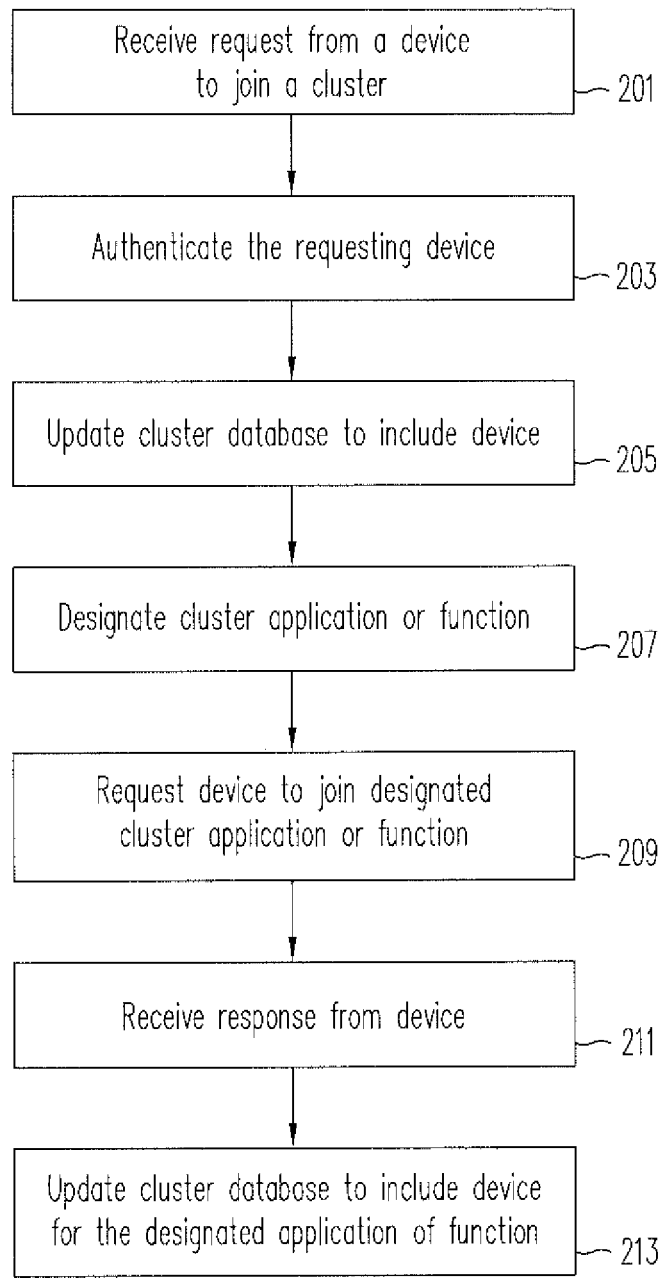
FIG. 2 shows a flow chart illustrating a method for configuring a mobile device to join a cluster of mobile devices and for a cluster master to request that the mobile device collaborate on applications or share device functionalities according to one or more embodiments of the present disclosure.

FIG. 2 shows a flow chart illustrating a method for configuring a mobile device to join a cluster of mobile devices and for a cluster master to request that the mobile device collaborate on applications or share device functionalities according to one or more embodiments of the present disclosure.

In step 201, a cluster master receives a request from a mobile device to join a cluster. The mobile device may be proximate to the cluster master and may connect to the cluster master through a local WiFi network. Alternatively, the mobile device may be located across town and may connect to the cluster master through a wide area network. Alternatively, the mobile device may be located across the world and may connect to the cluster master through the Internet. The cluster master may search through the cluster database to determine if the mobile device is a cluster member by looking for a unique identifier, such as an IP address, phone number, or other device/user identifier associated with the mobile device. If the mobile device is not found in the cluster database, the cluster master may authenticate the requesting mobile device in step 203. As mentioned, the level of security in the authentication step may be a function of the size of the network. For example, if the mobile device is connected to the local WiFi, it may be authenticated by simply verifying that the mobile device is on a contact list of trusted users. On the other hand, if the mobile device is connected to the Internet, a more secure authentication protocol requiring the user of the mobile device to establish an account and a security code may be required.

In step 205, after the mobile device is authenticated, the cluster master may update the cluster database to include information on the mobile device, such as its IP address, phone number, device identifier, user account, security code etc. The cluster master may also request that the mobile device provide its device features, functionalities, configuration, etc. so that the cluster database may be updated with this information to help the cluster master determine what resources or device functionalities of the mobile device may be leveraged. In step 207, the cluster master designates applications or device functionalities that the cluster master would request the mobile device to collaborate on or share. The cluster master may designate applications that would benefit from having an additional cluster partner. For example, if the mobile device has a camera, the cluster master may designate a closed circuit TV application for collaboration with the mobile device because the mobile device would provide an additional camera for monitoring. Similarly, if the mobile device has recording capability, a music composition application may also be designated for collaboration because the mobile device would provide the capability to record an additional track of instrument. If there are already cluster partners identified in the cluster database for collaborating on an application, the mobile device may be an additional cluster partner. The cluster master may also designate device functionalities that it would like to leverage from the mobile device. If there is already a cluster partner identified in the cluster database for sharing a device functionality, the mobile device may be a secondary cluster partner so that the device functionality of the mobile device may be leveraged if the device functionality of a primary cluster partner is unavailable. Alternatively, the device functionality of the mobile device may be leveraged simultaneously with that of the other cluster partner or partners.

In step 209, the cluster master requests the mobile device to join the applications or share the device functionalities designated in step 207. The mobile device may determine which of the requested applications or device functionalities it would join or share with its cluster partners. For example, if the battery of the mobile device is low in storage capacity, the mobile device may not wish to share its battery. Similarly, if the mobile device will not be in a fixed location, it may not wish to join the closed circuit TV application to provide an additional camera. In step 211, the cluster master receives a response from the mobile device as to which applications or device functionalities the mobile device is willing to join or share. The cluster master updates the cluster database to add the mobile device as a cluster partner to those applications and device functionalities that the mobile device would be joining or sharing. When there is more than one cluster partner to share in a device functionality, the cluster partners may be leveraged in the order in which the cluster partners are listed in the cluster database. For example, if the device functionality for battery lists a first cluster partner followed by the newly added mobile device as a second cluster partner, the battery of the mobile device may be leveraged only when the batteries of the cluster master and the first cluster partner are both low. Conversely, if the device functionality for battery lists a third cluster partner after the mobile device, the mobile device may leverage the battery of the third cluster partner when the battery of the mobile device is low. After the cluster master updates the cluster database, a copy of the cluster database may be distributed to all the cluster partners including the mobile device so that the mobile device would know which applications it may be called upon to join, which device functionalities the mobile device may provide, and which device functionalities of other cluster partner may be leveraged by the mobile device.

Figure 3:
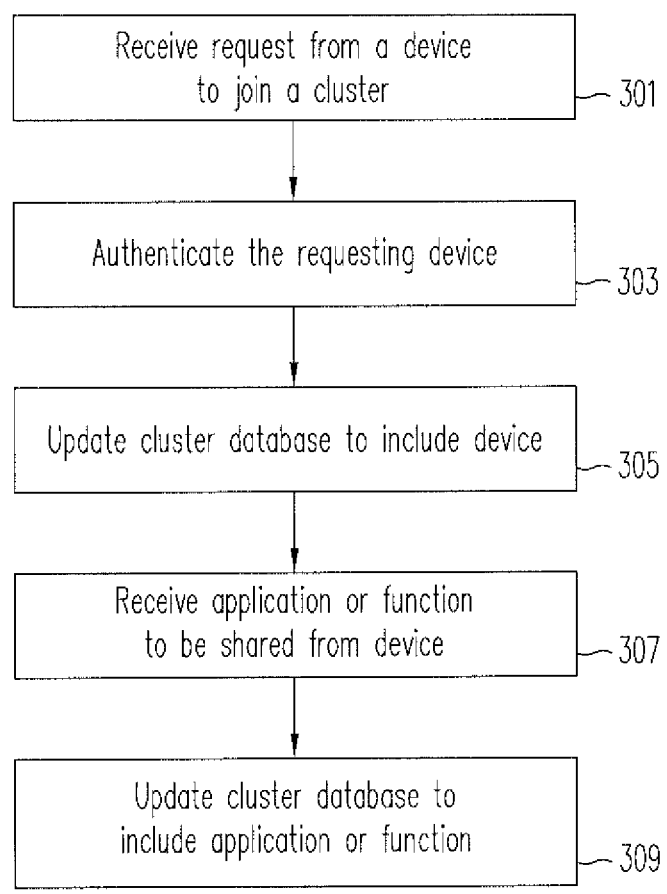
FIG. 3 shows a flow chart illustrating a method for configuring a mobile device to join a cluster of mobile devices and for the mobile device to designate the applications or device functionalities for collaboration or sharing according to one or more embodiments of the present disclosure.

FIG. 3 shows a flow chart illustrating a method for a cluster master configuring a mobile device to join a cluster of mobile devices and for the mobile device to designate the applications or device functionalities for collaboration or sharing according to one or more embodiments of the present disclosure. In step 301, a cluster master receives a request from a mobile device to join a cluster. The mobile device may be a new device joining the cluster or an existing cluster member reactivating its heartbeat signal to signify that it wishes to rejoin the cluster. The cluster master may authenticate the requesting mobile device in step 303, similar to step 203 of FIG. 2. If the mobile device is a new device, in step 305, the cluster master may update the cluster database to include information on the mobile device and its device features, functionalities, configuration, etc. similar to step 205. On the other hand, if the mobile device is rejoining the cluster, the cluster master may read the heartbeat signal and update the cluster database to include the applications and device functionalities the mobile device is joining or sharing. In step 307, if the mobile device is a new device, the mobile device may indicate to the cluster master the applications or device functionalities the mobile device wishes to join or share. This is in contrast to FIG. 2 where the cluster master requests the mobile device to collaborate on designated applications or to share designated device functionalities. If a collaborating application or a shared device functionality as received from the mobile device has not previously been identified by the cluster master, the cluster master may request additional cluster partners to collaborate on the application or to share the device functionality. In step 309, the cluster master updates the cluster database to add the mobile device as a cluster partner for the applications and device functionalities received in step 307.

Figure 4:
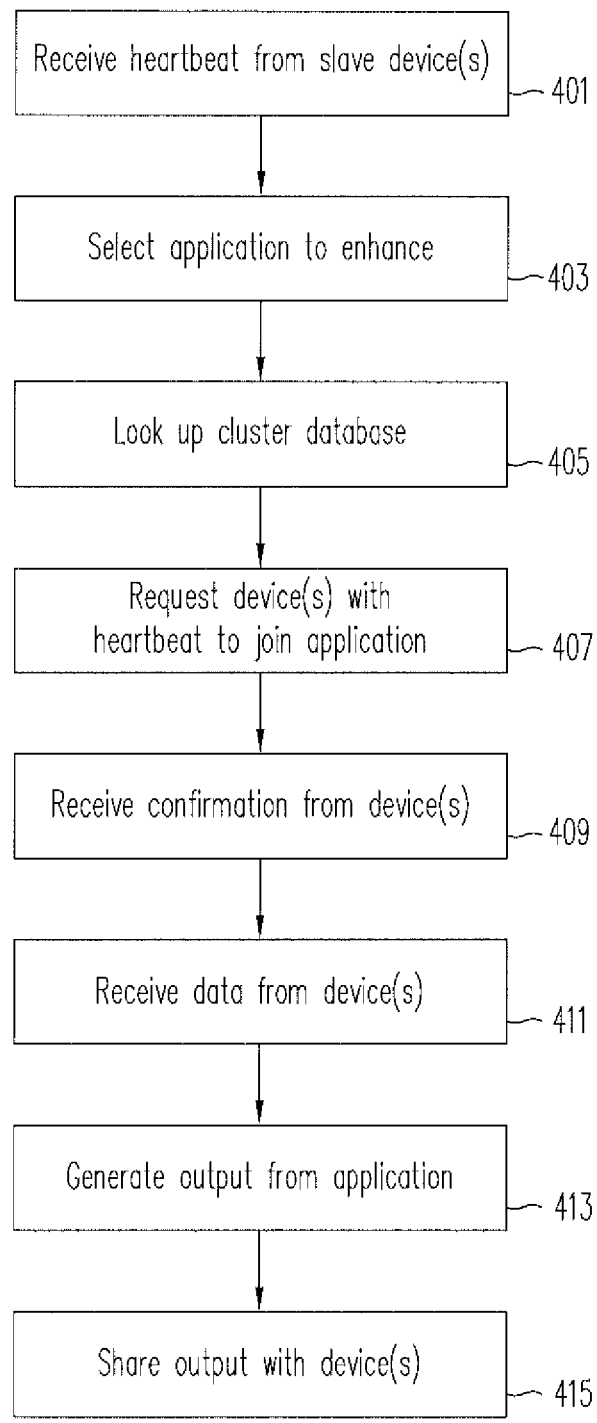
FIG. 4 shows a flow chart illustrating a method for cluster members to collaborate on a resident application as requested by a cluster master according to one or more embodiments of the present disclosure.

FIG. 4 shows a flow chart illustrating a method for cluster members to collaborate on a resident application as requested by a cluster master according to one or more embodiments of the present disclosure.

In step 401, a cluster master receives heartbeat signals from cluster members that are available to join an application or to provide a device functionality. Based on the received heartbeat signals, the cluster master identifies the available cluster members, and the applications for collaboration and the device functionalities for sharing from each available cluster member. The cluster master may update the listings of cluster partners for each application or device functionality in the cluster database accordingly. A cluster member that has stopped transmitting its heartbeat signal may be identified as an unavailable member and removed as a cluster partner from its associated entries in the cluster database. In step 403, a user selects a shared application to run on the cluster master in collaboration with its cluster partners. For example, a user may select a music composition application that generates music compositions having up to four recording tracks.

In step 405, the cluster master looks up the cluster database to identify cluster partners available to collaborate on the selected application. The cluster master selects the cluster partners it will invite to collaborate on the selected application. For example, for the music composition application, the cluster master may select three additional cluster partners to collaborate on a music composition having four recording tracks by selecting the cluster partners from the list of available cluster partners for the music composition application in the cluster database. In step 407, the cluster master invites the selected cluster partners to join the application. This can be sent as a text message, pop-up, voice, by other means, or by a combination of protocols so that users of the cluster partners can be notified of the invitation. The cluster partners receive the invitation from the cluster master, and the user of each cluster partner may either accept or decline the invitation. For example, the cluster master may present links or menu buttons on the mobile device of the cluster partner for the user to accept or decline the invitation. When the user clicks on a link or taps on a button, the cluster partner transmits a response back to the cluster master. In step 409, the cluster master receives the responses and instructs the cluster partners that have accepted the invitation to collaborate on the application. In one or more embodiments of the present disclosure, the cluster master may instruct the cluster partner to collaborate on the application without issuing an invitation to the cluster partner and waiting for an acceptance of the request from the cluster partner. The cluster master may transmit commands and instructions to the cluster partners to activate certain applications to process or generate data. The command or instruction may be sent as a text message, pop-up command, voice, API command, by other means, or by a combination of protocols. The cluster master may also transmit data to the cluster partners for processing. For example, for the music composition application, the cluster master may invite the three cluster partners to collaborate on the music composition. If all three cluster partners accept the invitation, the cluster master may instruct each cluster partner to record a track with a selected instrument for a specified length of time. If any cluster partner declines the invitation, the cluster master may look up the cluster database to select another cluster partner to invite to join the application. As part of the instruction to start a recording, the cluster master may specify a metronome beat to synchronize the four tracks recorded by the cluster partners and by the cluster master.

In step 411, the cluster partners collaborate on the application and transmit requested data back to the cluster master. In one or more embodiments, a cluster partner may stop its running of the application and transmit a completion message back to the cluster master when all the requested data have been generated. In other embodiments, a cluster partner may continue generating data until commanded to stop by the cluster master. During the time a cluster partner is collaborating on the application, the cluster partner may continue to generate a heartbeat signal to indicate that it is collaborating on the application or that it is unavailable to run other applications. In step 413, the cluster master generates the final output from the application using data received from the cluster partners and data internally generated by the cluster master. In step 415, the cluster master shares the final output from the application with the collaborating cluster partners. For example, for the music composition application, each of the three cluster partners along with the cluster master records a track of music with a selected instrument at a specified metronome beat. The three cluster partners transmit the three recorded tracks to the cluster master. The cluster master combines the three recorded tracks from the cluster partners with its own recorded track to generate a final music composition. The cluster master may then share the final music composition with the three cluster partners.

The steps outlined in FIG. 4 may also be implemented without a cluster master. For example, each member in the cluster may maintain a copy of the cluster database. Any member may monitor heartbeat signals received from any other cluster members to identify cluster partners that are available to collaborate on an application or to share a device functionality. The member may update the listings of cluster partners for each application or device functionality in the cluster database accordingly. When a member desires to run an application, it may look up the cluster database to select cluster partners it will invite from the listing of available cluster partners to join the application. The invitation may be sent as a text message, pop-up, voice, by other means, or by a combination of protocols so that users of the cluster partners can be notified of the invitation. The invitation may present links or menu buttons on the mobile device of the cluster partner for the user to accept or decline the invitation. When the user accepts the invitation by clicking on the link or tapping on the button, the cluster partner transmits a confirmation response that is received by all the other cluster partners. Therefore, any member has knowledge of the cluster partners who are available to collaborate on the application.

A member may activate the application by transmitting commands and instructions to its cluster partners to activate certain applications to process or generate data. The command or instruction may be sent as a text message, pop-up command, voice, API command, or by other means. When the application is activated, each cluster partner may generate or process data and transmit the data to all its other cluster partners and may also receive data from all its other cluster partners. The movement of data among the cluster partners may be made by a combination of multiple protocols. Similarly, a member may transmit commands or instructions to its cluster partners by a combination of multiple protocols. Thus, each cluster partner may generate its final output from the application in collaboration with the other cluster partners. For example, for the music composition application, each cluster partner records a musical track of the composition, transmits its recording to all its cluster partners, receives recordings from all its cluster partners, and generates the final musical composition.

Figure 5:
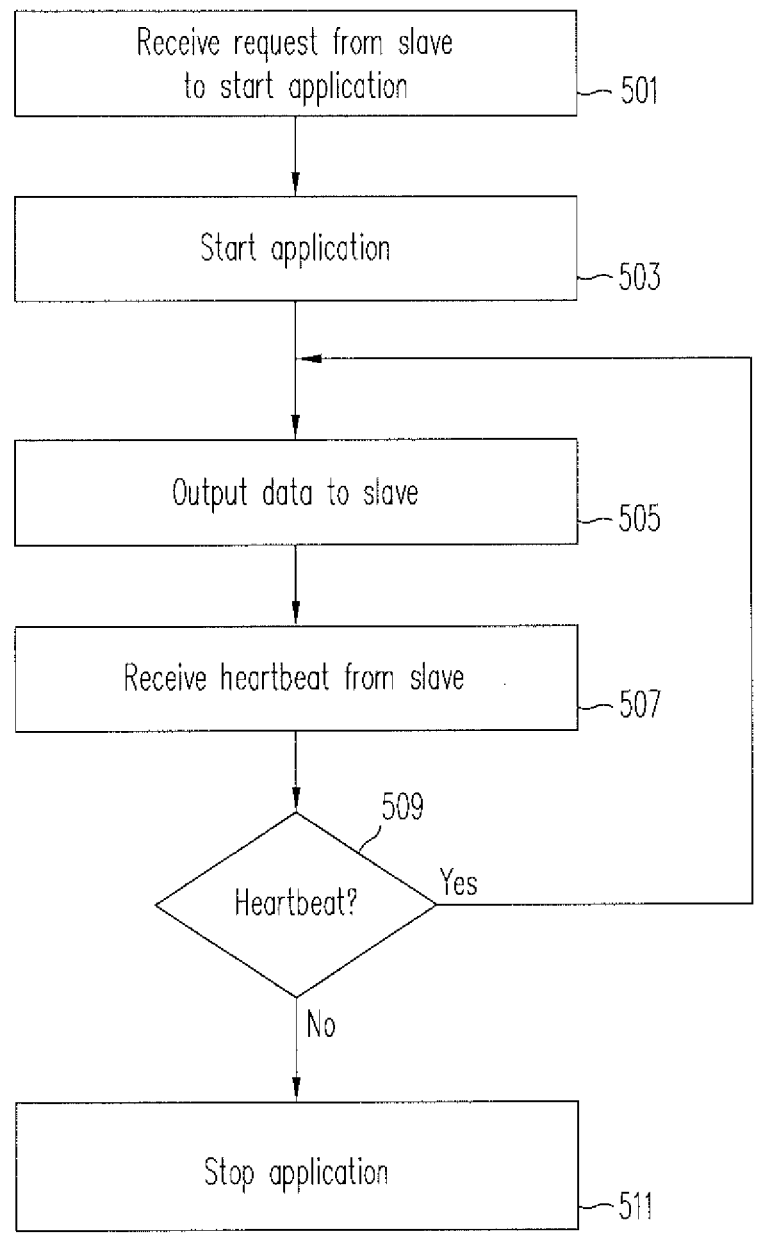
FIG. 5 shows a flow chart illustrating a method for cluster members to collaborate on a resident application as requested by a cluster slave according to one or more embodiments of the present disclosure.

FIG. 5 shows a flow chart illustrating a method for cluster members to collaborate on a resident application as requested by a cluster slave according to one or more embodiments of the present disclosure.

In step 501, a cluster master receives a request from a member to start an application. The cluster master may look up the cluster database to identify additional cluster partners who may want to join the application. Similar to steps 407, the cluster master may invite the additional cluster partners to join the application. The invitation may be sent as a text message, pop-up, voice, by other means, or by a combination of protocols so that users of the cluster partners can be notified of the invitation. The invitation may present links or menu buttons on the mobile device of the cluster partner for the user to accept or decline the invitation. Similar to step 409, when the user accepts the invitation by clicking on the link or tapping on the button, the cluster partner transmits a confirmation response that is received by the cluster master. In step 503, the member activates the application in the cluster master. The member may transmit commands and instructions to the cluster master to activate certain applications to process or generate data. The command or instruction may be sent as a text message, pop-up command, voice, API command, or by other means. The member may also transmit data to the cluster master for processing. The cluster master may request additional input from the member such as by presenting links or menu buttons on the mobile device of the member for selection by the user. In step 505, the cluster master runs the application and outputs data from the application to the member and to the other cluster partners who have joined. The cluster master may also receive data for the application from the member and the cluster partners. For example, a cluster member may request a video streaming service from a cluster master connected to a video server. The cluster master may look up the cluster database to identify additional cluster partners for the video streaming service. The cluster master may invite the additional cluster partners to join the video streaming service. The cluster master may request the cluster member to select a video available from the video server by presenting a menu of videos on the cluster member. After a user of the cluster member selects the video, the cluster master starts the video streaming service to stream the selected video to the cluster member and to all other cluster partners who have joined.

A cluster partner may signal its continued participation in the application to the other cluster partners through its heartbeat signal. Therefore, when a cluster partner no longer desires to participate in the application, it may stop transmitting its heartbeat signal. Alternatively, a cluster partner may transmit a heartbeat signal or a message indicating that it is no longer participating in the application. In step 507, the cluster master monitors the heartbeat signals of the cluster partners to determine if any of the cluster partners has discontinued participating in the application. The cluster master discontinues outputting data from the application to, and discontinues receiving data to the application from, those cluster partners who are discontinuing their participation in the application. In step 509, the cluster master determines if there is heartbeat signal from at least one cluster partner joining in the application. If there is heartbeat signal from at least one cluster partner joining in the application, the cluster master continues to output data to or receive data from the active cluster partners for the application. If there is no heartbeat signal from any of the cluster partners joining in the application, the cluster master terminates the application in step 511. For example, for the video streaming service, when a cluster partner turns off the streaming video, the cluster partner may stop transmitting its heartbeat signal. The cluster master may monitor the heartbeat signals from all the cluster partners receiving the streaming video and may terminate the streaming video to any cluster partner whose heartbeat signal is missing. When all the cluster partners have turned off the video, the cluster master does not detect heartbeat signals from any of the cluster partners. The cluster master may then terminate the videos streaming service.

Figure 6:
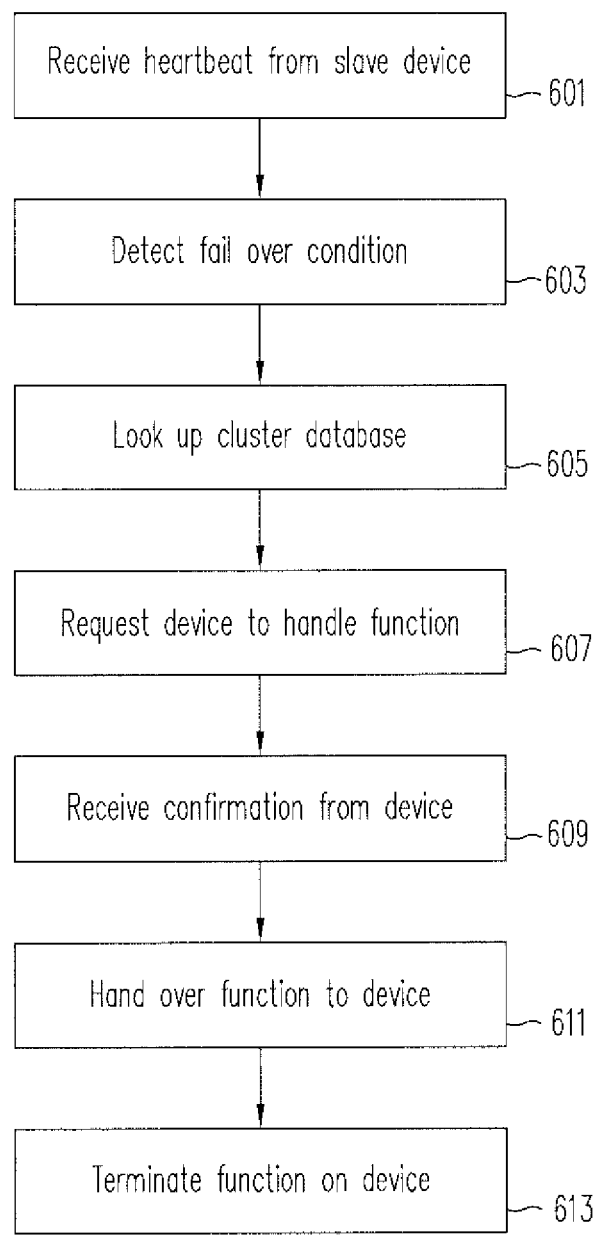
FIG. 6 shows a flow chart illustrating a method for cluster members to share device functionalities in a failover condition according to one or more embodiments of the present disclosure.

FIG. 6 shows a flow chart illustrating a method for cluster members to share device functionalities in a failover condition according to one or more embodiments of the present disclosure.

In step 601, a cluster master receives heartbeat signals from cluster members that are available to provide a device functionality. Similar to step 401, the cluster master may update the listing of cluster partners for each device functionality in the cluster database based on the cluster members identified as being available. A cluster member may not be available to provide a device functionality for various reasons, such as when it is running an application that renders the device functionality unavailable, or when it is low in battery power, etc. The updated cluster database may be propagated to all the cluster members. In step 603, a cluster member referred to as a primary member detects a failover condition. In step 605, the primary member looks up the cluster database to identify cluster partners available to provide the device functionality associated with the failover condition. As mentioned, device functionalities of a mobile device may include voice, cellular data, battery, WiFi, memory, CPU, display, GPS, etc. The failover condition associated with the voice and cellular data may occur when the mobile device is experiencing poor cellular signal reception; the failover condition associated with the battery may occur when the battery power is below a certain threshold level; the failover condition associated with the WiFi may occur when the WiFi signal strength is low or when the available bandwidth is low; the failover condition associated with memory may occur when the mobile device is running low in physical or virtual memories; the failover condition associated with CPU may occur when the mobile device's CPU is heavily loaded.

For example, a primary member may be providing a tethered WiFi connection to a laptop. A cluster master may monitor the heartbeat signals from cluster partners available to provide device functionalities including WiFi. The cluster master may update the cluster database to include cluster partners available to provide WiFi functionality and propagate the cluster database to the primary member. When the primary member experiences a failover condition associated with the WiFi such as when the WiFi signal strength is poor or when the available bandwidth is low, the primary member may look up the cluster database to identify a cluster partner available to provide WiFi functionality so that the tethered WiFi connection to the laptop may operate without interruptions.

In step 607, the primary member requests an identified cluster partner to provide the device functionality associated with the failover condition. The request may be sent as a text message, pop-up, voice, or by other means, so that a user of the cluster partner can be notified of the request. The request may present links or menu buttons on the mobile device of the cluster partner for the user to accept or decline the request. The cluster partner may accept or decline the request by clicking on the link or tapping on the button. The cluster partner transmits its response back to the primary member in step 609. If the cluster partner declines the request, the primary member may repeat steps 605, 607, and 609 to look up the cluster database to identify additional cluster partners available to provide the device functionality and to make a request to the additional cluster partners. If the cluster partner accepts the request, the primary member leverages the device functionality of the cluster partner by handing over the provision of the device functionality to the cluster partner in step 611. For example, for the tethered WiFi connection to the laptop, the primary member may request the identified cluster partner to provide WiFi functionality. If the cluster partner accepts the request, the primary member may instruct the cluster partner to provide the tethered WiFi connection to the laptop. The cluster partner then becomes the new primary member for the tethered WiFi connection. The new primary member in turn may have other cluster partners available to provide WiFi functionality or other device functionalities. Thus, there may be a hierarchy of shared device functionalities to ensure continuous operation of mission critical applications across different failover conditions. In one or more embodiments of the present disclosure, for mission critical applications the primary member may leverage the device functionality of the cluster partner without waiting for an acceptance of the request from the cluster partner. In step 613, when the device functionality of the primary member is no longer needed, the primary member terminates the application using the device functionality and releases the device functionality as available for use by other applications.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the present disclosure, such as program code and/or data for configuring a cluster of mobile devices and for leveraging resident applications or device functionalities of the mobile devices, may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, even though a cluster of mobile devices is described, non-mobile computing devices may also be suitable for configuring into a cluster. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

I claim:

1. A mobile device system comprising:
a non-transitory memory storing a cluster database comprising information for one or more shared resources, and for each of the one or more shared resources, device identifiers for mobile device cluster partners of a cluster network available to use all or part of the one or more shared resources to process a computing task with a task-initiating mobile device cluster partner of the mobile device cluster partners, and wherein the mobile device cluster partners include the mobile device system; and one or more hardware processors configured to execute instructions to cause the mobile device system to perform operations comprising:

receiving an indication of a failover condition of the mobile device system based on a battery power of the mobile device system that is being consumed by application data processing performed by the mobile device system;

determining a resource required for use by the mobile device system for the application data processing, wherein the resource is listed in one or more shared resources in the cluster database, and wherein offloading the application data processing to the mobile device cluster partners reduces consumption of the battery power;

determining, using the cluster database, at least one of the mobile device cluster partners to perform the application data processing using the resource with the mobile device system;

transmitting a request to use the resource to the at least one of the mobile device cluster partners;

in response to being authorized by the at least one of the mobile device cluster partners, extending the battery power of the mobile device system by using the resource at the at least one of the mobile device cluster partners;

reducing use of the resource at the mobile device system; and terminating use of the resource by at least one of the one or more mobile device cluster partners based on requirements of the mobile device system for the resource and a change in the battery power.

2. The mobile device system of claim 1, wherein the resource for use further comprises an application whose resource required to run the application is distributed among the mobile device system and the at least one of the mobile device cluster partners, and wherein the mobile device system coordinates use of the resource on the mobile device system and on the at least one of the mobile device cluster partners to provide an output from the application on the mobile device system.

3. The mobile device system of claim 1, wherein the operations further comprise:

receiving a confirmation that the at least one of the mobile device cluster partners is ready to use the resource with the mobile device system; and determining that the at least one of the mobile device cluster partners is available to use the resource with the mobile device system.

4. The mobile device system of claim 3, wherein determining the at least one of the mobile device cluster partners comprises selecting from the cluster database the at least one of the mobile device cluster partners available to use the resource.

5. The mobile device system of claim 3, wherein receiving the confirmation comprises receiving monitored communications on the cluster network that comprise a heartbeat signal from a mobile device cluster partner signifying its availability to use the resource.

6. The mobile device system of claim 1, wherein the request to use the resource is sent using a member of the cluster network.

7. The mobile device system of claim 1, wherein the resource for use further comprises a device functionality of the mobile device cluster partners that is also found in the mobile device system, and wherein the operations further comprise:

replacing or extending functionality of the mobile device system with the device functionality of the at least one of the mobile device cluster partners.

8. The mobile device system of claim 7, wherein the device functionality of the at least one of the mobile device cluster partners replaces or extends the device functionality of the mobile device system without an interruption in the application data processing.

9. The mobile device system of claim 1, wherein the operations further comprise:

designating one of the at least one of the mobile device cluster partners of the cluster network to become a cluster master during the failover condition.

10. The mobile device system of claim 1, wherein the operations further comprise:

receiving entry in the cluster network from a cluster master;

receiving update information from the cluster master, wherein the update information comprises monitored communications on the cluster network by the cluster master; and updating the cluster database based on the update information.

11. The mobile device system of claim 1, wherein the cluster database further comprises an order for use of the mobile device cluster partners for each of the one or more shared resources depending on use of one or more applications needed to complete the computing task, and wherein the operations further comprise:

determining a hierarchy of use of the at least one of the mobile device cluster partners using the order for use in the cluster database, wherein using the resource is further based on the hierarchy.

12. A method of collaborating on shared resources among cluster partners of a cluster network, comprising:

maintaining, by a mobile device, a cluster database comprising information for one or more shared resources, and for each of the one or more shared resources, device identifiers for mobile device cluster partners of a cluster network available to use all or part of the one or more shared resources process a computing task with a task-initiating mobile device cluster partner of the mobile device cluster partners, and wherein the mobile device cluster partners include the mobile device;

receiving an indication of a failover condition of the mobile device based on a battery power of the mobile device that is being consumed by application data processing performed by the mobile device;

determining, by the mobile device, a resource required for use by the mobile device for the application data processing, wherein the resource is listed in the one or more shared resources in the cluster database, and wherein offloading the application data processing to the mobile device cluster partners reduces consumption of the battery power;

determining, by the mobile device using the cluster database, at least one of the mobile device cluster partners to perform the application data processing using the resource with the mobile device;

transmitting a request to use the resource to the at least one of the mobile device cluster partners;

in response to being authorized by the at least one of the mobile device cluster partners, extending the battery power of the mobile device by using the resource at the at least one of the mobile device cluster partners;

reducing use of the resource at the mobile device; and terminating use of the resource by at least one of the one or more mobile device cluster partners based on requirements of the mobile device for the resource and a change in the battery power.

13. The method of claim 12, wherein the resource for use further comprises an application whose resource required to run the application is distributed among the mobile device and the at least one of the mobile device cluster partners, and wherein using the resource comprises coordinating use of the resource on mobile device and on the at least one of the mobile device cluster partners when running the application.

14. The method of claim 12, receiving by the mobile device a confirmation that the at least one of the mobile device cluster partners is ready to use the resource with the mobile device; and determining that the at least one of the mobile device cluster partners is available to use the resource with the mobile device.

15. The method of claim 14, wherein determining at least one of the mobile device cluster partners comprises selecting from the cluster database the at least one of the mobile device cluster partners from the mobile device cluster partners available to use the resource with the mobile device.

16. The method of claim 14, wherein receiving the confirmation comprises receiving monitored communications on the cluster network that comprise a heartbeat signal from a mobile device cluster partner signifying its availability to use the resource.

17. The method of claim 12, wherein the request to use the resource is sent using a member of the cluster network.

18. The method of claim 12, wherein the resource for use further comprises a device functionality of the mobile device cluster partners that is also found in the mobile device, and wherein the method further comprises:

replacing or extending the device functionality of the mobile device with the device functionality of the at least one of the mobile device cluster partners.

19. The method of claim 18 wherein the device functionality of the mobile device is replaced or extended by the device functionality of the at least one of the mobile device cluster partners without an interruption in the application data processing.

20. A non-transitory machine-readable medium having stored thereon a plurality of machine readable instructions executable to cause a machine to perform operations comprising:

maintaining, by a mobile device, a cluster database comprising information for one or more shared resources, and for each of the one or more shared resources, device identifiers for mobile device cluster partners of a cluster network available to use all or part of the one or more shared resources to process a computing task with a task-initiating mobile device cluster partner of the mobile device cluster partners, and wherein the mobile device cluster partners include the mobile device;

receiving an indication of a failover condition of the mobile device based on a battery power of the mobile device that is being consumed by application data processing performed by the mobile device;

determining, by the mobile device, a resource for use by the mobile device for the application data processing, wherein the resource is listed in the one or more shared resources in the cluster database, and wherein offloading the application data processing to the mobile device cluster partners reduces consumption of the battery power;

determining, by the mobile device using the cluster database, at least one of the mobile device cluster partners to perform the application data processing using the resource with the mobile device;

transmitting a request to use the resource to the at least one of the mobile device cluster partners;

in response to being authorized by the at least one of the mobile device cluster partners, extending the battery power of the mobile device by using the resource at the at least one of the mobile device cluster partners;

reducing use of the resource at the mobile device; and terminating use of the resource by at least one of the one or more mobile device cluster partners based on requirements of the mobile device for the resource and a change in the battery power.

* * * * *